United States Patent [19]

Barlow et al.

[11] Patent Number: 4,543,381

[45] Date of Patent: * Sep. 24, 1985

[54] TREE RETARDANT ADDITIVE COMPOSITION FOR POLYMERIC INSULATION

[75] Inventors: Anthony Barlow; Melvin F Maringer, both of Cincinnati, Ohio

[73] Assignee: National Distillers and Chemical Corporation, New York, N.Y.

[*] Notice: The portion of the term of this patent subsequent to Aug. 23, 2000 has been disclaimed.

[21] Appl. No.: 507,615

[22] Filed: Jun. 24, 1983

Related U.S. Application Data

[63] Continuation-in-part of Ser. No. 394,052, Jun. 30, 1982, Pat. No. 4,400,429, which is a continuation of Ser. No. 219,021, Dec. 22, 1980, abandoned.

[51] Int. Cl.$^4$ ................................................. C08K 5/54
[52] U.S. Cl. ............................. 524/188; 174/110 SR; 174/110 PM; 174/110 V; 524/114; 524/262; 524/264; 524/265
[58] Field of Search .................. 174/110 SR, 110 PM, 174/110 V; 524/188, 262, 264, 265, 114; 556/401, 466; 252/400

[56] References Cited

U.S. PATENT DOCUMENTS

| | | | |
|---|---|---|---|
| 3,177,170 | 4/1965 | Lund | 524/262 |
| 4,299,713 | 10/1981 | Maringer et al. | 524/583 |
| 4,305,849 | 12/1981 | Kawasaki et al. | 174/110 SR |
| 4,397,981 | 8/1983 | Doi et al. | 174/110 PM |
| 4,400,429 | 8/1983 | Barlow et al. | 524/265 |

OTHER PUBLICATIONS

Edwin P. Plueddemann, "Silane Coupling Agents", *Additives for Plastics*, vol. 1, (State of the Art), Raymond B. Seymour, editor, (1978), pp. 123-167.

Salvatore, J. Monte et al., "Nonsilane Coupling Agents", *Additives for Plastics*, vol. 1, (State of the Art), Raymond B. Seymour, editor, (1978) pp. 169-191.

*Primary Examiner*—Veronica P. Hoke
*Attorney, Agent, or Firm*—Kenneth D. Tremain

[57] ABSTRACT

An unfilled polymeric composition having improved electrical treeing and water treeing properties comprising a polymeric component and effective amounts of a silane and a fatty acid. The compositions are particularly useful as insulation for high voltage transmission and distribution cables.

21 Claims, No Drawings

TREE RETARDANT ADDITIVE COMPOSITION FOR POLYMERIC INSULATION

This is a continuation-in-part of application Ser. No. 394,052, filed June 30, 1982, now U.S. Pat. No. 4,400,429 issued on Aug. 23, 1983, which in turn is a continuation of application Ser. No. 219,021, filed Dec. 22, 1980 now abandoned.

BACKGROUND OF THE INVENTION

1. Field of the Invention

This invention relates to tree retardant additives. More particularly, it relates to a combination of tree retardant additives which provides a significantly high level of both water tree and electrical tree retardation when added to polymeric electrical insulation. This invention especially relates to a combination of tree retardant additives which acts synergistically when admixed with a polymeric electrical insulation.

2. Description of the Prior Art

Polymeric compositions are well-known and are used extensively as insulation materials for wire and cable. As an insulator, it is important that the composition have various physical and electrical properties, such as resistance to mechanical cut-through, stress crack resistance and dielectric failure. Recent publications have indicated that water tree growth and electrical tree growth in the insulation are particularly important problems since they are associated with, though not necessarily totally responsible for, dielectric failure. The term "tree" has been applied to this type of insulation breakdown since the area of failure is a void space having the appearance of a tree in profile, i.e., the shape of a tree trunk and its upper foliage. Treeing usually is a slowly developing phenomenon and may take years to cause a failure in the insulation.

An important application for an insulation material is in high voltage transmission and distribution cable, especially in direct buried underground service. Two types of trees have been observed in these power cables, to wit, electrical trees and water trees, which are sometimes referred to as electrochemical trees. It is generally believed that electrical trees are generated by corona discharges causing fusion and breakdown of the polymer, whereas water trees are usually observed in cables buried in wet locations and have a different appearance compared to electrical trees. Metal ions are usually found in water trees.

U.S. Pat. No. 4,144,202 of Ashcraft et al. relates to inhibiting the electrical breakdown of insulation by water treeing in dielectric materials based on ethylene polymers As disclosed in this patent, water treeing is inhibited in the ethylene polymer compositions by employing therein organo silane compounds having an epoxy containing radical. German Offenlegungsschrift No. 2,737,430 discloses that certain alkoxysilanes added to polyolefin insulation prevent water-tree formation.

U.S. Pat. No. 4,206,260 of McMahon relates to insulation particularly suitable for high voltage power cable containing an effective amount of an alcohol of 6 to 24 carbon atoms which imparts electrical tree growth resistance to the composition.

U.S. Pat. No. 3,553,348 of Betts, and British Pat. Nos. 1,248,256 and 1,277,378 of General Electric Company relate to mineral filled polymer compositions useful as electrical wire and cable insulation. The mineral filler comprises at least 25% of the composition and is treated with an organosilane such as an alkyl alkoxysilane or a vinyl alkoxysilane to decrease the porosity of the composition. The silane interacts with the reinforcing filler and apparently facilitates a filler-polymer interaction. None of these patents teach or suggest that addition of an organosilane to an unfilled polymer composition will beneficially enhance both the water treeing and electrical treeing resistance of the polymer composition.

U.S. Pat. No. 4,048,129 to Voigt relates to cross-linking of thermoplastic or elastomeric material in the presence of moisture and on the basis of grafting silane on the macro-molecules of the material. A fatty acid and a metal oxide is added to a thermoplastic polymer composition to result in a reaction which produces water and subsequent cross-linking of the polymer system.

U.S. Pat. No. 4,001,128 to Penneck discloses a filler system for polymers comprising aluminum trihydrate and silica filler treated with silanes.

U.S. Pat. No. 4,274,996 to Hawley relates to improving the thermal stability of ethylene polymers by admixing a stabilizing amount of a silane compound to the ethylene polymer.

Commonly assigned U.S. Pat. No. 4,299,713 issued Nov. 10, 1981 discloses a number of organic compounds described by a generic formula, which provides both electrical tree and water tree retardant properties to an unfilled polymeric composition, i.e. a polymer composition containing 0 to 10% mineral filler. A group of preferred polymeric compositions are disclosed in this patent which are described by the formula:

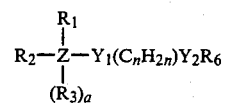

wherein $R_1$, $R_2$ and $R_3$ are the same or different and are $Y_1(C_nH_{2n})Y_2R_6$, $C_1$ to $C_8$ alkyl, $C_1$ to $C_8$ alkoxy, $C_1$ to $C_8$ acyloxy, $C_6$ to $C_{18}$ aryloxy or substituted aryloxy, $C_6$ to $C_{18}$ aryl or substituted aryl, hydrogen, halogen, an epoxy containing radical, $C_2$ to $C_8$ alkenyl, a nitrogen containing radical, a carboxy containing radical, a mercapto containing radical or an ether containing radical; $R_6$ is $C_1$ to $C_8$ alkyl, $C_1$ to $C_8$ alkoxy, $C_1$ to $C_8$ acyloxy, $C_6$ to $C_{18}$ aryloxy or substituted aryloxy, $C_6$ to $C_{18}$ aryl or substituted aryl, hydrogen, halogen, an epoxy containing radical, $C_2$ to $C_8$ alkenyl, a nitrogen containing radical, a carboxy containing radical, a mercapto containing radical or an ether containing radical; $Y_1$ and $Y_2$ are the same or different and are O, S or NH; Z is Si, Sn, Ti, P or B; a is 0 or 1; and n is 1 to 8. Vinyl-tris (2-methoxyethoxy) silane is particularly preferred among these silanes. The preferred silanes of this application exhibit both water tree resistance and electrical tree resistance when present at a concentration of about 1.5% in the polymeric composition. However, the electrical insulating properties of these compositions, as measured by dielectric constant and dissipation factors, are in some instances, somewhat reduced from those exhibited by the polymeric component of the composition.

It is an object of this invention to provide a polymeric composition having good water tree resistance and good electrical tree resistance while simultaneously exhibiting satisfactory electrical insulating properties as measured by dielectric constant and dissipation factor It is another object of this invention to improve the electrical insulating properties of polymeric compositions containing water tree and electrical tree retardant additives.

It is a further object of this invention to improve the electrical insulating properties of the silane-containing polymeric compositions of U.S. Pat. No. 4,299,713.

SUMMARY OF THE INVENTION

In accordance with the present invention, it has been found that a two component composition of a silane and a fatty acid will provide not only enhanced resistance to water treeing and electrical treeing when admixed with a polymeric insulating composition but also improved retention of electrical insulating properties. The combined effect of the two component composition is synergistic whereby the treeing inhibition and insulating properties of the polymeric composition are improved to a degree unattainable with either of the components. These polymeric compositions may be cured by known techniques to provide a crosslinked composition having certain improved properties for certain applications.

The polymeric composition of this invention may be described as comprising:

a homogeneous mixture of polymeric component and a water treeing and an electrical treeing inhibitor comprising (1) a silane having the formula:

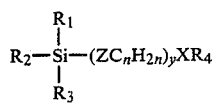

wherein $R_1$, $R_2$ and $R_3$ are the same or different and are $(ZC_nH_{2n})_yXR_4$, $C_1$ to $C_8$ alkyl, $C_1$ to $C_8$ alkoxy, $C_1$ to $C_8$ acyloxy, $C_2$ to $C_8$ alkenyl, $C_6$ to $C_{18}$ aryl or substituted aryl or $C_6$ to $C_{18}$ aryloxy or substituted aryloxy, $R_4$ is $C_1$ to $C_8$ alkyl, $C_6$ to $C_{18}$ aryl or substituted aryl or hydrogen, Z is methylene, O, NH, or S; X is O, NH, or S; and n is 1 to 8 and y is to 1 to 5 when Z is O and X is O, NH or S, and n is 2 ans y is 1 when Z is methylene and X is O, NH or S, and (2) an unsubstituted or an aryl-substituted $C_{10}$ to $C_{20}$ fatty acid, said aryl substituent being a $C_6$ to $C_{18}$ aryl or substituted aryl, said silane and said fatty acid each being provided in an amount which when combined with the other provides a combined amount which is effective to inhibit water treeing and electrical treeing in said polymeric composition which does not adversely affect the electrical insulating properties of said polymeric composition.

This invention is also directed to a method of stabilizing a polymeric insulated electrical conductor against water treeing and electrical treeing which comprises coating an electrical conductor with an insulating effective amount of polymeric insulating composition, said composition comprising a homogeneous mixture of a polymeric component and a water treeing and an electrical treeing inhibitor comprising:

(1) a silane having the formula:

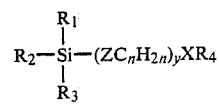

wherein $R_1$, $R_2$ and $R_3$ are the same or different and are $(ZC_nH_{2n})_yXR_4$, $C_1$ to $C_8$ alkyl, $C_1$ to $C_8$ alkoxy, $C_1$ to $C_8$ acyloxy, $C_2$ to $C_8$ alkenyl, $C_6$ to $C_{18}$ aryl or substituted aryl or $C_6$ to $C_{18}$ aryloxy or substituted aryloxy, $R_4$ is $C_1$ to $C_8$ alkyl, $C_6$ to $C_{18}$ aryl or substituted aryl or hydrogen, Z is methylene, O, NH, or S; X is O, NH or S; and n is 1 to 8 and y is 1 to 5 when Z is O, and X is 0, NH or S, and n is 2 and y is 1 when Z is methylene and Z is O, NH or S, and (2) an unsubstituted or an aryl-substitut $C_{10}$–$C_{20}$ fatty acid, said aryl substituent being a $C_6$ to $C_{18}$ aryl or substituted aryl, said silane and said fatty acid each being provided in amoun.t which when combined with the other provides a combined amount which is effective to inhibit water treeing and electrical treeing in said polymeric composition and which does not adversely affect the insulating properties of said polymeric composition, whereby said insulated electrical conductor exhibits water treeing and electrical treeing inhibition when exposed to an environment subject to water treeing and electrical treeing conditions.

This invention is also directed to the two component water tree and electrical tree inhibitor composition for polymeric compositions comprising:

(a) a silane having the formula:

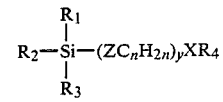

wherein $R_1$, $R_2$ and $R_3$ are the same or different and are $(ZC_nH_{2n})_yXR_4$, $C_1$ to $C_8$ alkyl, $C_1$ to $C_8$ alkoxy, $C_1$ to $C_8$ acyloxy, $C_2$ to $C_8$ alkenyl, $C_6$ to $C_{18}$ aryl or substituted aryl or $C_6$ to $C_{18}$ aryloxy or substituted aryloxy, $R_4$ is $C_1$ to $C_8$ alkyl, $C_6$ to $C_{18}$ aryl or substituted aryl, or hydrogen, Z is methylene, O, NH or S; X is O, NH or S; and n is 1 to 8 and y is 1 to 5 when Z is O, and X is O, NH, or S, and n is 2 and y is 1 when Z is methylene and X is O, NH or S, and (b) an unsubstituted or an aryl substituted $C_{10}$ to $C_{20}$ fatty acid, said aryl substituent being a $C_6$ to $C_{18}$ aryl or substituted aryl, said silane and said fatty acid each being provided in an amount which when combined with the other provides a combined amount which is effective to inhibit water treeing and electrical treeing in polymeric compositions and which does not adversely affect the electrical insulating properties of polymeric compositions.

DESCRIPTION OF THE PREFERRED EMBODIMENTS

The present invention relates to two component water tree and electrical tree inhibitor compositions for use with polymeric electrical insulating compositions. The combined effect of these two components is synergistic in that the treeing inhibition and the effect on dielectric properties of the insulation is substantially improved over that provided by either of the components alone. Broadly, the insulating composition contains a polymeric component and the two component treeing inhibitor of a silane and an aryl-substituted or unsubstituted fatty acid. An example of the treeing inhibitor is vinyl-tris (phenoxyethoxy) silane and phenyl stearic acid.

Among the organic silanes disclosed in U.S. Pat. No. 4,299,713 are a number which provides both good water tree resistance and good electrical tree resistance. In some instances where good electrical tree resistance is obtained the silane apparently has a somewhat adverse effect on the insulating properties of the polymer since the polymeric composition exhibits a high dielectric constant (above 2.3) and a high dissipation factor (above 0.001). It is preferred that these insulating properties should be somewhat lower. Ideally, the dielectric constant should not be significantly above 2.3 and the dissipation factor should not be above 0.0009 for a polymeric insulating composition. If the concentration of the silane is reduced significantly below that disclosed in the copending application, the insulating properties of the insulation are improved but the tree retardant properties are reduced. Long chain fatty acids show evidence of good water tree retardancy but rather poor electrical tree retardancy. Their effect on the dielectric properties of the polymer insulation is variable depending upon the structure of the fatty acid. Some of the fatty acids and their derivatives do not produce the adverse effect on the dielectric properties noted with some organic silanes. The fatty acids can, however, "bloom" to the surface of the composition, which is a very undesirable condition.

It has been found that by employing significantly lower concentrations of the organic silanes employed heretofore and small concentrations of fatty acids, a synergistic effect is produced in a polymeric insulating composition to which the combination is added. Specifically, the composition exhibits substantially the same water tree and electrical tree resistance obtained with the organic silane alone plus a significant reduction in the adverse effect on electrical insulating properties noted with the organic silane alone.

In general, the polymers suitable for the practice of this invention include any normally solid synthetic organic polymeric thermoplastic resin. Included are polyolefins and copolymers thereof, vinyls, olefin-vinyl copolymers, olefin-allyl copolymers, polyamides, acrylics, ethylene propylene rubber (EPR), ethylene propylene diene monomer (EPDM), polystyrenes, cellulosics, polyesters and fluorocarbons.

The polyolefins include normally solid polymers of olefins, particularly mono-alpha-olefins, which comprise from about two to about six carbon atoms, e.g., polyethylene, polypropylene, polybutene, polyisobutylene, poly(4-methyl-pentene), and the like. Preferred polyolefins are polyethylene and polypropylene. Polyethylene is especially preferred. An especially preferred polyethylene because of its demonstrated effectiveness is termed NA 310 and is sold by National Distillers and Chemical Corporation.

Copolymers of ethylene, and other compounds interpolymerizable with ethylene such as butene-1, pentene-1, styrene and the like may be employed. In general the ethylene copolymers will comprise about 50 to 100 weight % ethylene.

Suitable vinyl polymers include polyvinyl chloride, polyvinyl acetate, vinyl chloride/vinyl acetate copolymers, polyvinyl alcohol and polyvinyl acetal.

Suitable olefin-vinyl copolymers include ethylene-vinyl acetate, ethylene-vinyl propionate, ethylene-vinyl isobutyrate, ethylene-vinyl alcohol, ethylene-methyl acrylate, ethylene-ethyl acrylate, ethylene-ethyl methacrylate, and the like. In general the ethylene constitutes at least about 25% of the copolymer by weight.

Olefin-allyl copolymers include ethylene-allyl benzene, ethylene-allyl ether, ethylene-acrolein, and the like.

The silane employed in the polymeric compositions of the invention may be selected from one or more compounds of the following formula:

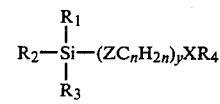

where
$R_1$, $R_2$ and $R_3$ are the same or different and are $(ZC_nH_{2n})_yXR_4$, $C_1$ to $C_8$ alkyl, $C_1$ to $C_8$ alkoxy, $C_1$ to $C_8$ acyloxy, $C_2$ to $C_8$ alkenyl, $C_6$ to $C_{18}$ aryl or substituted aryl or $C_6$ to $C_{18}$ aryloxy or substituted aryloxy, $R_4$ is $C_1$ to $C_8$ alkyl, $C_6$ to $C_{18}$ aryl or substituted aryl or hydrogen, Z is methylene, O, NH or S; X is O, NH or S; and n is 1 to 8 and y is 1 to 5 when Z is O and X is O, NH or S, and n is 2 and y is 1 when Z is methylene and X is O, NH or S.

Among the useful silanes of the above formula are gamma-methacryloxypropyl-tris(2-methoxyethoxy)silane, tetrakis (2-methoxyethoxy)silane, methyl-tris(2-methoxyethoxy)silane, phenyl-tris(2-methoxyethoxy)silane, vinyl-tris(2-methoxyehtoxy)silane, methyl-tris(2-phenoxyethoxy) silane and vinyl-tris(2-phenoxyethoxy)silane with the latter two being preferred. Hydrocarboxypolyalkoxy silanes are included in the above formula and are exemplified by such compounds as vinyl-tris(phenoxydiethoxy) silane, vinyl-tris(phenoxytriethoxy)silane and the like. Epoxysilanes such as beta-(3,4-epoxycyclohexyl) ethyltrimethoxysilane and gamma-glycidoxypropyltrimethoxysilane, are also useful silanes. Mixtures of the useful silanes may be used, particularly mixtures of the monoalkoxy, dialkoxy and trialkoxy species of a useful silane as they are often conveniently prepared from mixtures of their corresponding alcohols.

A number of organic silanes useful in connection with the present invention is shown in "Chemicals and Plastics Physical Properties. 1978-80" published by Union Carbide Company on page 43 the disclosure of which is hereby incorporated by reference.

Amino silanes and their reaction products may also be useful silanes in accordance with the invention.

The fatty acid employed in the polymeric compositions of the invention is described as an unsubstituted $C_{10}$–$C_{20}$, preferably $C_{12}$–$C_{18}$, fatty acid or an aryl substituted $C_{10}$–$C_{20}$, preferably $C_{12}$–$C_{18}$, fatty acid where the aryl substituent may be a $C_6$–$C_{18}$, preferably $C_6$, aryl group or substituted aryl group. Among the useful fatty acids are capric, lauric, myristic, palmitic, stearic and arachidic acids while the aryl substituents include those such as phenyl, tolyl, ethylphenyl, propylphenyl, xylyl and the like. Among the preferred fatty acids are stearic acid, phenyl-stearic acid and tolyl-stearic acid.

The two component inhibitor is admixed with the polymeric insulating composition in an amount which is effective to provide the required degree of water tree inhibition and electrical tree inhibition as well as the desired level of insulting properties. This requires that not only an effective amount of the two component inhibitor be utilized but also that the two components be present in an effective ratio. The two component treeing inhibitor composition should comprise about 0.1 to 5 parts of inhibitor per hundred parts of polymer (phr or parts per 100 parts resin). A preferred polymeric composition comprises about 0.2 to 2.5 phr of the inhibitor, especially about 0.5 to 1.5 phr. In the inhibitor composition the ratio of silane to fatty acid is about 3:1 to about 1:1, preferably, about 2.5:1 to about 1.5:1.

When it is desired to use a polymeric composition which can be crosslinked, crosslinking can be accomplished by any of the known procedures such as chemical means including peroxide cross-linking; by radiation using electron accelerators, $\gamma$-rays, high energy radiation, such as X-rays, microwaves etc,; or by thermal crosslinking. The basic procedures for crosslinking polymers are extremely well known to the art and need not be described here in detail.

Conventional crosslinking agents such as organic peroxides may be suitably employed. Typical organic peroxide free radical generators include dicumyl peroxide; 2,5-bis (tert.-butylperoxy)-2,5 dimethylhexane; di-t-butyl peroxide; benzoyl peroxide; $\alpha$, $\alpha'$ bis(t-butyl peroxy) diisopropyl benzene and the like, as discussed in U.S. Pat. No. 3,287,312. The amount of organic peroxide, when employed, will range from about 0.5 to 5.0% by weight based on the total weight of the composition, or about 0.5 to 10 phr, preferably 3 to 6 phr.

While the silanes described hereinabove are useful for both thermoplastic and cured polymeric compositions, for compositions to be cured it is often preferred that one of the groups, to wit, $R_1$, $R_2$, or $R_3$, be an organo functional group, e.g., a vinyl group, which group provides the composition with enhanced curing properties.

Minor amounts of other additives may also be employed in conventional amounts to obtain the desired results. Conventional antioxidants such as the hindered phenols, polyquinolines and the like may be employed. Other ingredients that may be included are plasticizers, dyes, pigments, heat and light stabilizers, antistatic agents and the like.

The compositions of this invention may be filled or unfilled polymer compositions. Filled polymeric compositions generally contain from about 25 to about 60% of a mineral filler and the filled compositions of this invention may contain mineral fillers within this stated range. The term "unfilled" as applied to the instant compositions shall mean a composition which contains less that 10% of a conventional polymer filler. For certain applications and to meet particular specifications the unfilled compositions herein may contain no filler. The unfilled compositions of this invention may contain, therefore, 0 to less than 10% filler. Accordingly, fillers, such as mineral fillers, may be employed to this limited extent in preparing the unfilled compositions of the invention, but in a preferred embodiment and for certain uses, these unfilled compositions contain no fillers.

The polymer compositions of this invention can be prepared by mixing the various ingredients. When the inhibitor composition and the polymeric component are mixed together to form the instant compositions, the silane, the fatty acid and the polymeric component are homogeneously dispersed in each other. The order of mixing and the specific procedure employed are not critical except to the extent that from the time the peroxide, if employed, is added a temperature of less than about 130° C. is required to prevent premature curing of the composition. This precaution, however, is conventional in the art.

The components may be mixed on a variety of apparatus including multi-roll mills, screw mills, continuous mixers, compounding extruders and Banbury mixers.

After being extruded onto wire or cable, or other substrate, the crosslinkable compositions are vulcanized at elevated temperatures, e.g., above about 180° C. using conventional vulcanizing procedures.

In order to determine the utility and effectiveness of the polymeric compositions of the present invention with regard to its inhibiting effect on the water treeing and the electrical treeing thereof, the compositions were evaluated by the use of accelerated tests. The dielectric properties of the compositions were evaluated by measuring the dielectric constant and the dissipation factor by conventional test procedures.

Electrical tree tests were performed using a method similar to ASTM 3756. Strips of the test material approximately 1" wide were cut from a ¼" thick compression molded plaque. The block was machined to give a strip having parallel edges 1" apart. The strip was then cut into 1" square blocks. A blunt needle and a sharp needle were inserted into opposite parallel edges, at elevated temperatures, so that the points were ⅛" apart. Needle insertion and cooling of the sample was performed slowly to avoid inducing thermal or mechanical stresses in the specimen. The sharp needle had a tip diameter of about 0.005" while the diameter of the blunt needle was .0.06. Eight specimens were prepared and tested simultaneously for each composition. The electrical tree test was performed by energizing the sharp needle at 15 KV using a frequency of 60 Hz; the blunt needle was connected to ground. The time required for each of the eight specimens to fail by tree growth and subsequent electrical short was recorded. The time required for 50% of the samples to fail was employed to characterize the effectiveness of the tree retardant being evaluated.

The water tree test was performed using a procedure similar to that described in U.S. Pat. No. 4,144,202. A compression molded disc about 150 millimeters (mm.) in diameter having 10 conical depressions was prepared for each composition. The geometry of the disc and dimensions of the depressions are substantially the same as shown in U.S. Pat. No. 4,144,202. The base of the disc was sprayed with silver paint which served as the ground electrode. An acrylic tube 6" long was clamped to the upper face forming a test cell. About 150 ml. of 0.01 N sodium chloride solution was poured into the cell and the air bubbles trapped on the surface of the sample were removed. A platinum wire ring was then immersed in the electrolyte and connected to an electrical supply which provided 5 KV at a frequency of 3 KHz. Samples were energized for 22 hours after which time they were removed from the test cell and washed with distilled water. The ten depressions were cut from the disc and stained to make the water trees more visible. Thin sections were obtained with a microtome, which were then examined microscopically (at 200×) and the tree size measured. Normally four discs were made for each sample so that the average tree size was calculated from forty individual measurements. In evaluating different tree retardants, the relative tree size was determined by comparing the average tree size obtained on a standard thermoplastic high voltage insulation material containing no tree retardant additives.

Various embodiments of the present invention will now be illustrated by reference to the following specific examples. It is to be understood, however, that such examples are presented for purposes of illustration only, and the present invention is in no way to be deemed as limited thereby. All parts, ratios and percentages are by weight and temperatures in degrees Fahrenheit unless otherwise noted.

EXAMPLE I

The sample compositions were prepared by milling a commercial grade of polyethylene (NA 310) and the required quantity of treeing additive being evaluated on a 2-roll mill at about 300° F. for about 10 minutes to obtain a homoeneous dispersion. The crepe obtained was then used to prepare the samples for electric tree and water tree testing and dielectric property evaluation using the procedures described hereinabove. The test results are shown in Table 1. All the compositions had the same formulation except for the "treeing" additive as noted in Table 1 and comprised a commercial grade of polyethylene having a Melt Index of about 0.20 to 0.35 g/10 min. and a density of about 0.917 grams/cubic centimeter (g/cc). The control sample did not contain a "treeing" additive.

TABLE I

| Treeing Additive | Additive Amount, % | Double Needle Test Time to 50% Failure (minutes) | Water Tree Test (Relative Tree Size) | Dielectric Constant | Dissipation Factor |
|---|---|---|---|---|---|
| Control (no additive) | — | 75 | 1.00 | 2.27 | 0.00006 |
| Vinyl-tris (2-phenoxy-ethoxy) silane | 1.5 | >6000 | 0.22 | 2.34 | 0.00138 |
| Vinyl-tris (2-phenoxy-ethoxy) silane | 0.5 | 81 | 0.31 | 2.25 | 0.00025 |
| Phenyl stearic acid | 1.5 | 132 | 0.33 | 2.28 | 0.000172 |
| Vinyl-tris (2-phenoxy-ethoxy) silane plus Phenyl stearic acid | 0.5 <br> 0.25 | >6000 | 0.34 | 2.31 | 0.000752 |
| gamma-methacryloxy-propyl tris(2-methoxy-ethoxy)silane | 1.5 | 678 | 0.41 | — | — |
| gamma-methacryloxy-propyl tris(2-methoxy-ethoxy)silane plus phenylstearic acid | 0.5 <br> 0.25 | 520 | — | — | — |

The above test results show that vinyl-tris (2-phenoxyethoxy) silane, at a concentration of 1.5%, exhibited excellent water tree and electrical tree retardancy and borderline acceptance of dielectric constant and dissipation factor. At a lower concentration of this silane, there was a considerable drop in electrical tree resistance, a small drop in the water tree resistance and a significant improvement in the insulating properties. The fatty acid material, at a concentration of 1.5%, showed satisfactory water tree resistance, very poor electrical tree resistance and generally acceptable dielectric properties. The fatty acid material also showed, at this concentration, discoloration of the polymer and exudation of the additive.

These data also show that the combination of vinyl-tris(2-phenoxyethoxy) silane and phenyl stearic acid provided a synergistic effect. This two component inhibitor provided a combination of treeing and dielectric properties which neither component provided by itself even where the concentration of the individual component was significantly higher when employed alone. When used at 0.25%, the fatty acid did not discolor the polymer or exude from the composition.

Further, these data show that gamma-methacryloxypropyl tris(2-methoxyethoxy)silane, at a concentration of 1.5% exhibited very good water tree and electrical tree retardancy. These data also show that the combination of gamma-methacryloxypropyl tris(2-methoxyethoxy)silane and phenylstearic acid provided for relatively small concentrations of each component —0.5% and 0.25%, respectively—has very good electrical tree resistance properties.

What is claimed is:

1. A polymeric composition having enhanced resistance to water treeing and electrical treeing consisting essentially of a homogeneous mixture of a polymeric component and a water treeing and an electrical treeing inhibitor consisting essentially of:

(1) a silane having the formula:

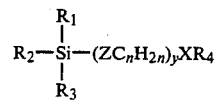

wherein $R_1$, $R_2$ and $R_3$ are the same or different and are $(ZC_nH_{2n})_yXR_4$, $C_1$ to $C_8$ alkyl, $C_1$ to $C_8$ alkoxy, $C_1$ to $C_8$ acyloxy, $C_2$ to $C_8$ alkenyl, $C_6$ to $C_{18}$ aryl or substituted aryl or $C_6$ to $C_{18}$ aryloxy or substituted aryloxy, $R_4$ is $C_1$ to $C_8$ alkyl, $C_6$ to $C_{18}$ aryl or substituted aryl or hydrogen, Z is methylene, O, NH or S; X is O, NH, or S, n is 1 to 8 and y is 1 to 5 when Z is O and X is O, NH or S, and n is 2 and y is 1 when Z is methylene and X is O, NH or S, and (2) an unsubstituted or an aryl-substituted $C_{10}$ to $C_{20}$ fatty acid, said aryl substituent being a $C_6$ to $C_{18}$ aryl or substituted aryl, said silane and said fatty acid each being provided in an amount which when combined with the other provides a combined amount which is effective to inhibit water treeing and electrical treeing in said polymeric composition and which does not adversely affect the electrical insulating properties of said polymeric composition, wherein the ratio of silane to fatty acid is in the range of about 3:1 to about 1:1, respectively.

2. A composition according to claim 1 wherein the polymer is polyethylene.

3. A composition according to claim 1 wherein
$R_1$ is vinyl,
$R_2$ and $R_3$ are each $(ZC_nH_{2n})_yXR_4$,
$R_4$ is phenyl, and
n is 2 and y is 1.

4. A composition according to claim 1 wherein
$R_1$ is methyl,
$R_2$ and $R_3$ are each $(ZC_nH_{2n})_yXR_4$,
$R_4$ is phenyl, and
n is 2 and y is 1.

5. A composition according to claim 1 wherein
$R_1$, $R_2$ and $R_3$ are each $(ZC_nH_{2n})_yXR_4$,
$R_4$ is phenyl, and
n is 2 and y is 1.

6. A composition according to claim 1 wherein
$R_1$ is vinyl,
$R_2$ and $R_3$ are each $(ZC_nH_{2n})_yXR_4$,
$R_4$ is methyl, and
n is 2 and y is 1.

7. A composition according to claim 1 wherein
$R_1$ is methyl,
$R_2$ and $R_3$ are each $(ZC_nH_{2n})_yXR_4$,
$R_4$ is methyl, and
n is 2 and y is 1.

8. A composition according to claim 1 wherein
$R_1$, $R_2$ and $R_3$ are $(ZC_nH_{2n})_yXR_4$,
$R_4$ is methyl, and
n is 2 and y is 1.

9. A composition according to claim 1 wherein the fatty acid is selected from the group consisting of stearic acid, phenyl stearic acid, and tolyl stearic acid.

10. A composition in accordance with claim 1 which is curable or cured.

11. A composition in accordance with claim 9 which is curable or cured.

12. An electrical conductor coated with the composition of claim 1.

13. An electrical conductor coated with the composition of claim 11.

14. The polymeric composition of claim 1 wherein the polymeric composition comprises about 0.2 to 2.5 phr of the water treeing and electrical treeing inhibitor.

15. The polymeric composition of claim 1 wherein the polymeric composition comprises 0.5 to 1.5 phr of the water treeing and electrical treeing inhibitor and the inhibitor composition is in the ratio of silane to fatty acid in the range of about 2.5:1, to about 1.5:1, respectively.

16. A method of stabilizing a polymeric insulated electrical conductor against water treeing and electrical treeing which comprises:
coating an electrical conductor with an insulating effective amount of polymeric insulating composition, said composition consisting essentially of a homogeneous mixture of a polymeric component and a water treeing and electrical treeing inhibitor consisting essentially of (1) a silane having the formula:

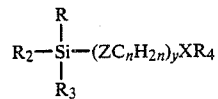

wherein
$R_1$, $R_2$ and $R_3$ are the same or different and are $(ZC_nH_{2n})_yXR_4$, $C_1$ to $C_8$ alkyl, $C_1$ to $C_8$ alkoxy, $C_1$ to $C_8$ acyloxy, $C_2$ to $C_8$ alkenyl, $C_6$ to $C_{18}$ aryl or substituted aryl or $C_6$ to $C_{18}$ aryloxy or substituted aryloxy,
$R_4$ is $C_1$ to $C_8$ alkyl, $C_6$ to $C_{18}$ aryl or substituted aryl, or hydrogen,
Z is methylene, O, NH or S; X is O, NH or S, n is 1 to 8 and y is 1 to 5 when Z is O and X is O, NH or S, and n is 2 and y is 1 when Z is methylene and X is O, NH or S, and (2) an unsubstituted or an aryl-substituted $C_{10}$–$C_{20}$ fatty acid, said aryl substituent being a $C_6$ to $C_{18}$ aryl or substituted aryl, said silane and said fatty acid each being provided in an amount which when combined with the other provides a combined amount which is effective to inhibit water treeing and electrical treeing in said polymeric composition and which does not adversely affect the insulating properties of said polymeric composition, whereby said insulated electrical conductor exhibits water treeing and electrical treeing inhibition when exposed to an environment subject to water treeing and electrical treeing conditions, wherein the ratio of silane to fatty acid is in the range of about 3:1 to about 1:1, respectively.

17. A method according to claim 16 wherein the fatty acid is selected from the group consisting of stearic acid, phenyl stearic acid and tolyl stearic acid.

18. A method according to claim 16 wherein the insulating composition is curable or cured.

19. A method according to claim 17 wherein the insulating composition is curable or cured.

20. A water tree and an electrical tree inhibitor composition for polymeric compositions consisting essentially of:
(a) a silane having the formula:

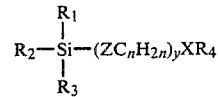

wherein
$R_1$, $R_2$ and $R_3$ are the same or different and are $(ZC_nH_{2n})_yXR_4$, $C_1$ to $C_8$ alkyl, $C_1$ to $C_8$ alkoxy, $C_1$ to $C_8$ acyloxy, $C_2$ to $C_8$ alkenyl, $C_6$ to $C_{18}$ aryl or substituted aryl or $C_6$ to $C_{18}$ aryloxy or substituted aryloxy,
$R_4$ is $C_1$ to $C_8$ alkyl, $C_6$ to $C_{18}$ aryl or substituted aryl or hydrogen,
Z is methylene, O, NH or S; X is O, NH or S, n is 1 to 8 and y is 1 to 5 when Z is O and X is O, NH or S, and n is 2 and y is 1 when Z is methylene and X is O, NH or S, and
(b) an unsubstituted or an aryl substituted $C_{10}$ to $C_{20}$ fatty acid, said aryl substituent being a $C_6$ to $C_{18}$ aryl or substituted aryl, said silane and said fatty acid each being provided in an amount which when combined with the other provides a combined amount which is effective to inhibit water treeing and electrical treeing in polymeric compositions and which does not adversely affect the electrical insulating properties of polymeric compositions, wherein the ratio of silane to fatty acid is in the range of about 3:1 to about 1:1, respectively.

21. A water tree and an electrical tree inhibitor composition according to claim 18 wherein the fatty acid is selected from the group consisting of stearic acid, phenyl stearic acid and tolyl stearic acid.

* * * * *